US009238440B1

(12) United States Patent
Bowser et al.

(10) Patent No.: US 9,238,440 B1
(45) Date of Patent: Jan. 19, 2016

(54) VEHICLE DOOR INCLUDING COMPARTMENT FOR DISPENSABLE PAPER PRODUCTS

(71) Applicant: Ford Global Technologies, LLC, Dearborn, MI (US)

(72) Inventors: Chris M. Bowser, Dearborn, MI (US); Joseph Porcari, Canton, MI (US); Michael G. Hobig, Eastpointe, MI (US); Brian Robert Spahn, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/453,645

(22) Filed: Aug. 7, 2014

(51) Int. Cl.
*B60R 7/04* (2006.01)
*B60J 5/04* (2006.01)
*B60R 7/08* (2006.01)

(52) U.S. Cl.
CPC ............... *B60R 7/046* (2013.01); *B60J 5/0413* (2013.01); *B60R 7/084* (2013.01)

(58) Field of Classification Search
CPC ................................ B60R 7/046; B60R 7/084
USPC .................................. 296/37.8, 37.13, 37.12
See application file for complete search history.

(56) References Cited

U.S. PATENT DOCUMENTS

| 1,682,580 | A | * | 8/1928 | Pratt ................................. 221/51 |
| 3,425,595 | A | * | 2/1969 | Shapira ............................ 221/52 |
| 5,213,243 | A | | 5/1993 | Landon |
| 5,795,005 | A | * | 8/1998 | Garfias et al. ................ 296/37.5 |
| 5,979,700 | A | * | 11/1999 | Suess ................................ 221/56 |
| 6,116,672 | A | * | 9/2000 | Cannon et al. .............. 296/37.13 |
| 6,196,605 | B1 | * | 3/2001 | Baldas et al. ............... 296/37.13 |
| 6,637,795 | B2 | | 10/2003 | Jonardi et al. |
| 6,824,007 | B2 | * | 11/2004 | Timmers et al. ................ 221/53 |
| 6,880,874 | B1 | | 4/2005 | Kallenberger et al. |
| 6,926,332 | B2 | | 8/2005 | Youngs et al. |
| 7,287,885 | B2 | | 10/2007 | Radu et al. |
| 7,328,825 | B2 | * | 2/2008 | Kaiser ........................... 224/543 |
| 7,832,790 | B2 | | 11/2010 | Plavetich |
| 8,562,065 | B2 | | 10/2013 | Langenbacher et al. |
| 2004/0217616 | A1 | * | 11/2004 | Haspel et al. .............. 296/37.13 |
| 2005/0252940 | A1 | * | 11/2005 | Brandstetter et al. ......... 224/543 |
| 2005/0253416 | A1 | * | 11/2005 | Radu et al. ................. 296/146.7 |
| 2014/0028044 | A1 | | 1/2014 | Hamamoto et al. |

FOREIGN PATENT DOCUMENTS

| DE | 29910893 U1 | * | 1/2000 |
| DE | 10154013 A1 | * | 5/2003 |
| JP | H08142762 A | | 6/1996 |
| JP | H11348667 A | | 12/1999 |

OTHER PUBLICATIONS

Machine Translation of DE29910893U1, printed from the EPO website, Jul. 20, 2015.*

* cited by examiner

*Primary Examiner* — Jason S Morrow
(74) *Attorney, Agent, or Firm* — Vichit Chea; Bejin Bieneman PLC

(57) ABSTRACT

A door for a vehicle includes an interior surface and a compartment extending into the interior surface for receiving a dispensable paper product. A cover is movable between a closed position covering the compartment and an open position exposing the compartment. The cover defines an opening for accessing the dispensable paper product. The cover includes an outer surface flush with the interior surface when the cover is in the closed position.

20 Claims, 9 Drawing Sheets

VEHICLE DOOR INCLUDING COMPARTMENT FOR DISPENSABLE PAPER PRODUCTS

BACKGROUND

A driver of a vehicle is often in need of a paper product such as a facial tissue or a napkin for use in wiping the driver's nose, face and/or fingers, for handling food, and/or for cleaning spills, e.g., food spills, in the cockpit of the vehicle. In order to accommodate such needs, the driver may place a supply of facial tissues in the vehicle.

For example, the driver may place facial tissues in a glove box of the vehicle. However, when the vehicle is in motion, the driver may be required to compromise safety by reaching across the cockpit to access the glove box. In the alternative, small supplies of facial tissue may be stored in a center console of the vehicle, on a sun visor of the vehicle, in a rear foot well of the vehicle, or on a seat back of the vehicle. However, each of these areas typically present packaging constraints that prevent storage of a large supply of facial tissues, such as a full-size box. Instead, the packaging constraints of these areas typically limit the supply of facial tissues to a small box or pouch of facial tissues. These small supplies can create a nuisance by requiring frequent re-filling.

During food purchases, such as a purchase from a drive-through window of a restaurant, a supply of loose napkins is typically supplied along with the food. This supply of napkins typically exceeds the amount of napkins necessary to handle the food. As such, the driver may store excess unused napkins in the vehicle, such as in the center console or the glove box. However, the storage of the napkins in the center console or the glove box may be disorganized and cluttered because the napkins are loose and may be stored with other articles in the center console or the glove box.

Accordingly, a need remains for the design of a storage system for storing paper products in a vehicle that stores the paper products in an organized and easily accessible manner.

DETAILED DESCRIPTION

Figure 1:
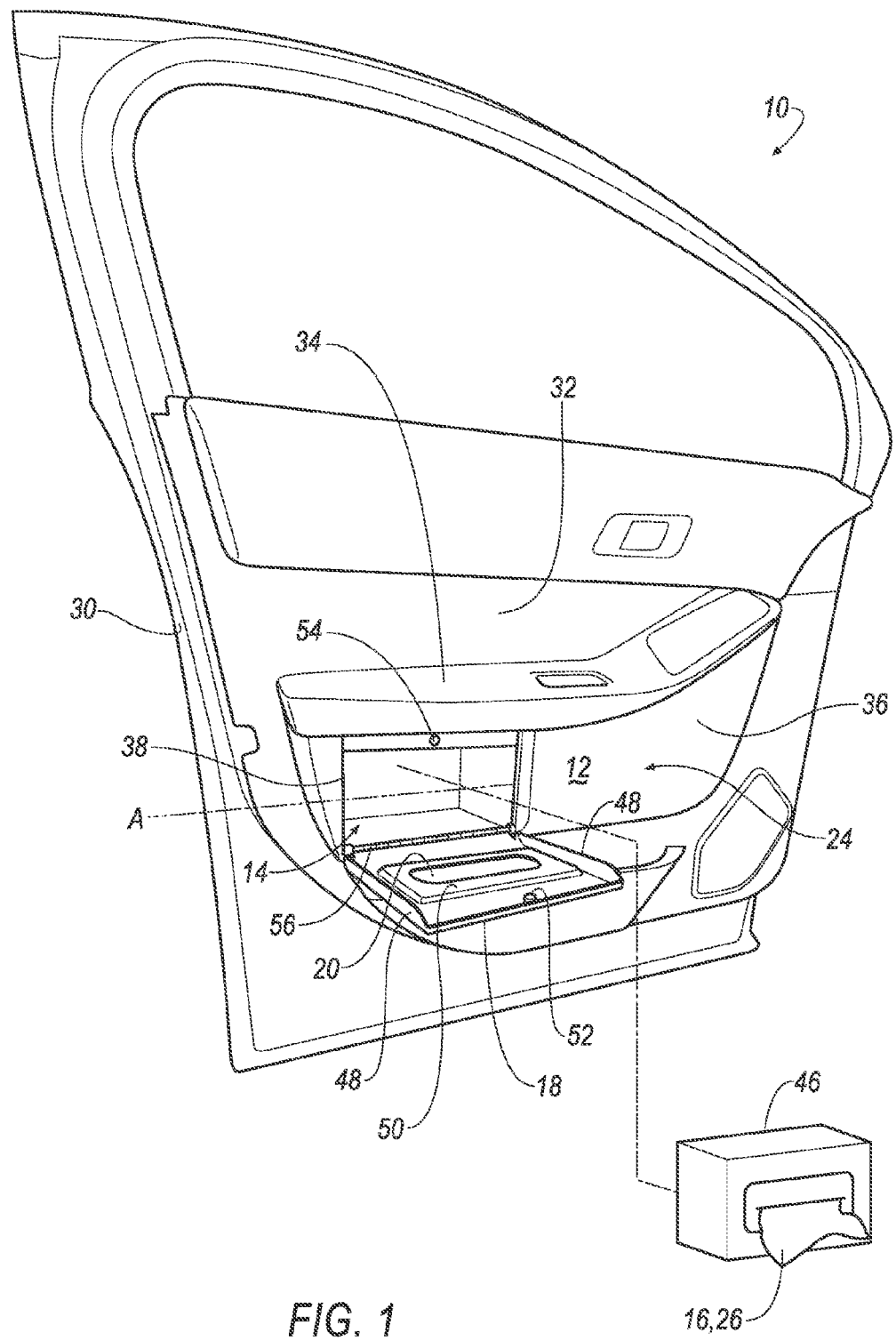
FIG. 1 is a perspective view of a door for a vehicle including a compartment and a cover in an open position.
Figure 2:
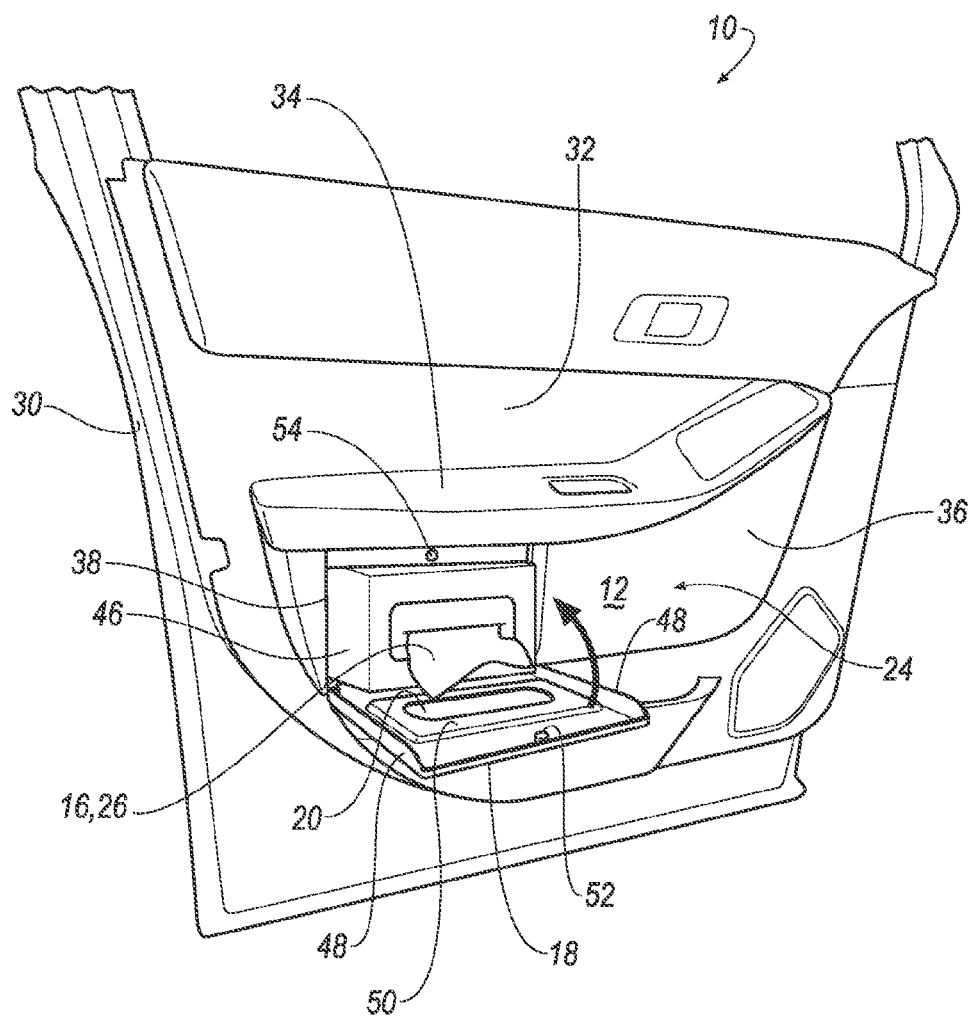
FIG. 2 is a perspective view of a portion of the door of FIG. 1 with a full-size box of facial tissue inserted into the compartment.
Figure 3:
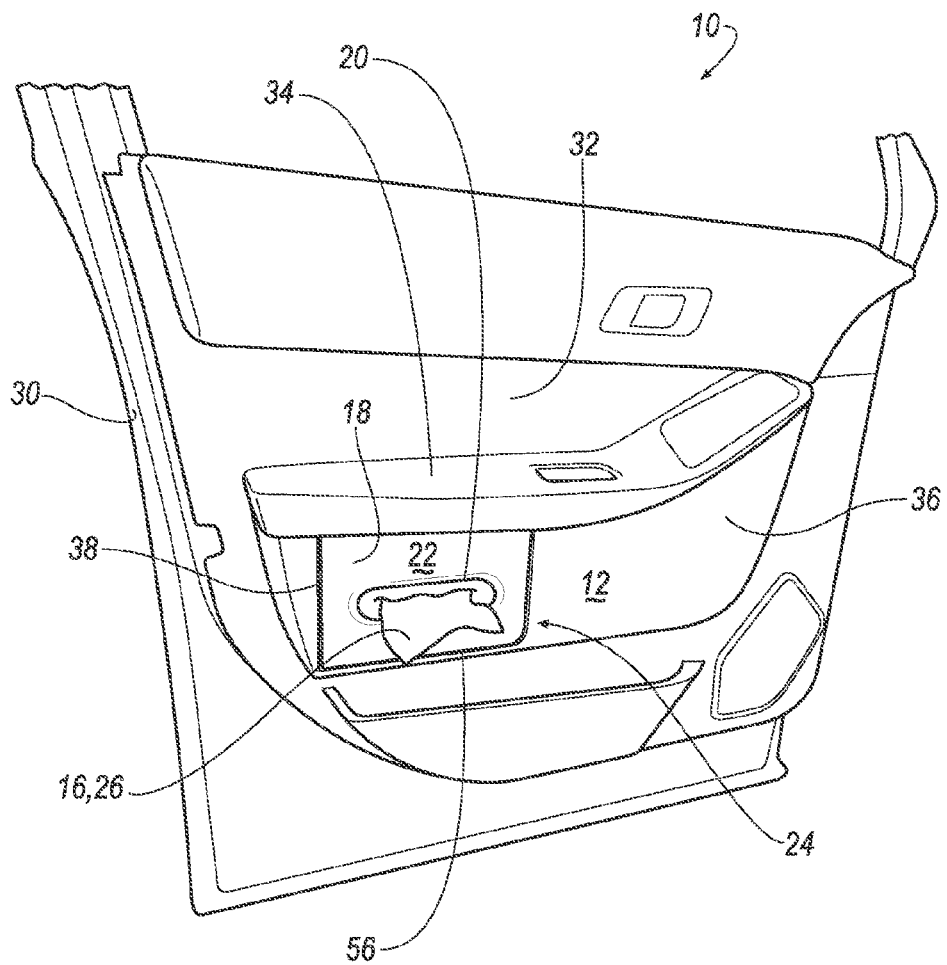
FIG. 3 is a perspective view of a portion of the door of FIG. 1 with the cover in the closed position.

With reference to the Figures, wherein like numerals indicate like parts throughout the several views, a door 10 for a vehicle (not shown) includes an interior surface 12 and a compartment 14 extending into the interior surface 12 for receiving a dispensable paper product 16. A cover 18 is movable between a closed position covering the compartment 14, as shown in FIG. 3, for example, and an open position exposing the compartment 14, as shown in FIGS. 1 and 2, for example. The cover 18 defines an opening 20 for accessing the dispensable paper product 16. The cover 18 includes an outer surface 22 flush with the interior surface 12 when the cover 18 is in the closed position.

Since the outer surface 22 of the cover 18 is flush with the interior surface 12 of the door 10, the compartment 14 and cover 18 does not interfere with interior space of the cabin of the vehicle and, as such, does not interfere with the space in which a driver occupies. In addition, since the outer surface 22 of the cover 18 is flush with the interior surface 12, the cover 18 is aesthetically pleasing and is inconspicuous.

The compartment 14 and the cover 18 form at least part of a storage system 24 for storing the dispensable paper product 16 in the vehicle in an organized manner and for easily dispensing the paper product 16. The paper product 16 may be, for example, facial tissues 26, napkins 28, wet wipes, etc. The paper products 16 are "dispensable" in that the paper products 16 are capable of being disposed from the storage system 24.

The door 10 may be the driver door 10, i.e., the driver-side front door 10, of the vehicle, as shown in the figures. The door 10 may alternatively be any door 10 of the vehicle. The vehicle includes multiple doors and one or more of the doors may include the storage system 24 shown in the figures. The vehicle may be any type of vehicle, such as an automobile.

With reference to the figures, the door 10 includes an exterior body 30 and a trim panel 32. The trim panel 32 presents the interior surface 12. The interior surface 12 may be, for example, vinyl, leather, etc.

The door 10 includes an armrest 34. In particular, the trim panel 32 may include the armrest 34. The armrest 34 is configured to support the arm of an occupant of the vehicle, e.g., the left arm of the driver in the configuration shown in the figures. The interior surface 12 extends beneath the armrest 34. The compartment 14 may extend into the interior surface 12 beneath the armrest 34 and the cover 18 may be disposed beneath the armrest 34.

The interior surface 12 of the trim panel 32 may define a raised contour 36 below the armrest 34 spaced from the door 10 frame. The compartment 14 may extend into the raised contour 36 toward the door 10 frame. The cover 18 may be flush with the raised contour 36.

As set forth above, the outer surface 22 of the cover 18 is flush with the interior surface 12 of the trim panel 32. In other words, the outer surface 22 is even, i.e., level with the interior surface 12 at an interface between the outer surface 22 and the interior surface 12.

The compartment 14 includes a perimeter 38 along the interior surface 12 and walls, such as a first end wall 40 and a second end wall 42, extending from the perimeter 38 into the trim panel 32 toward the outer frame of the door 10. The compartment 14 may include a back wall 44 defining a depth between the interior surface 12 and the back wall 44. The compartment 14 is configured to receive a full-size box 46 of facial tissues 26, i.e., the perimeter and depth are sized to receive the full-size box 46. The full-size box 46 may be, for example, 9 inches long, 4.75 inches wide, and 3.5 inches tall.

The interior surface 12 may define any suitable contours and the cover 18 is flush with the interior surface 12 along the contours, e.g., may follow the contours of the interior surface 12. The cover 18 is flush with the interior surface 12 along the entire perimeter of the compartment 14 when the cover 18 is in the closed position. The outer surface 22 of the cover 18 may be planar, or alternatively, may have any suitable shape.

The cover 18 may be of any suitable material such as, for example, plastic. The cover 18 may include ribs 48. The ribs 48 may be positioned along edges of the cover 18, as shown in FIGS. 1 and 2, for example, and/or may be positioned at any other suitable location of the cover 18. Additionally or alternatively to the ribs 48, the cover 18 may include portions 50 of varying thickness, as shown in FIGS. 1 and 2, for example. The ribs 48 and the portions 50 may be defined on an inward surface of the cover 18.

The storage system 24 may be tuned to change impact safety analysis, i.e., to alter the reaction of the storage system 24 during an impact of the vehicle such as a side impact. For example, thickness, width, and length of the ribs 48 and/or the portions 50 may be designed to accomplish a desired results during an impact safety analysis. For example, the ribs 48 and/or portions 50 may be designed to provide rigidity to the cover 18 to prevent cracking in the cover 18 during an impact.

The storage system 24 may include a retaining feature for retaining the cover 18 in the closed position. The retaining feature may include a magnet 52 disposed on one of the cover 18 and the compartment 14 and a metal keeper plate 58 54 disposed on the other of the cover 18 and the compartment 14. Alternatively or additionally, the retaining feature may include a latch (not shown), a spring 60 hinge 56 (not shown), etc.

Figure 8:
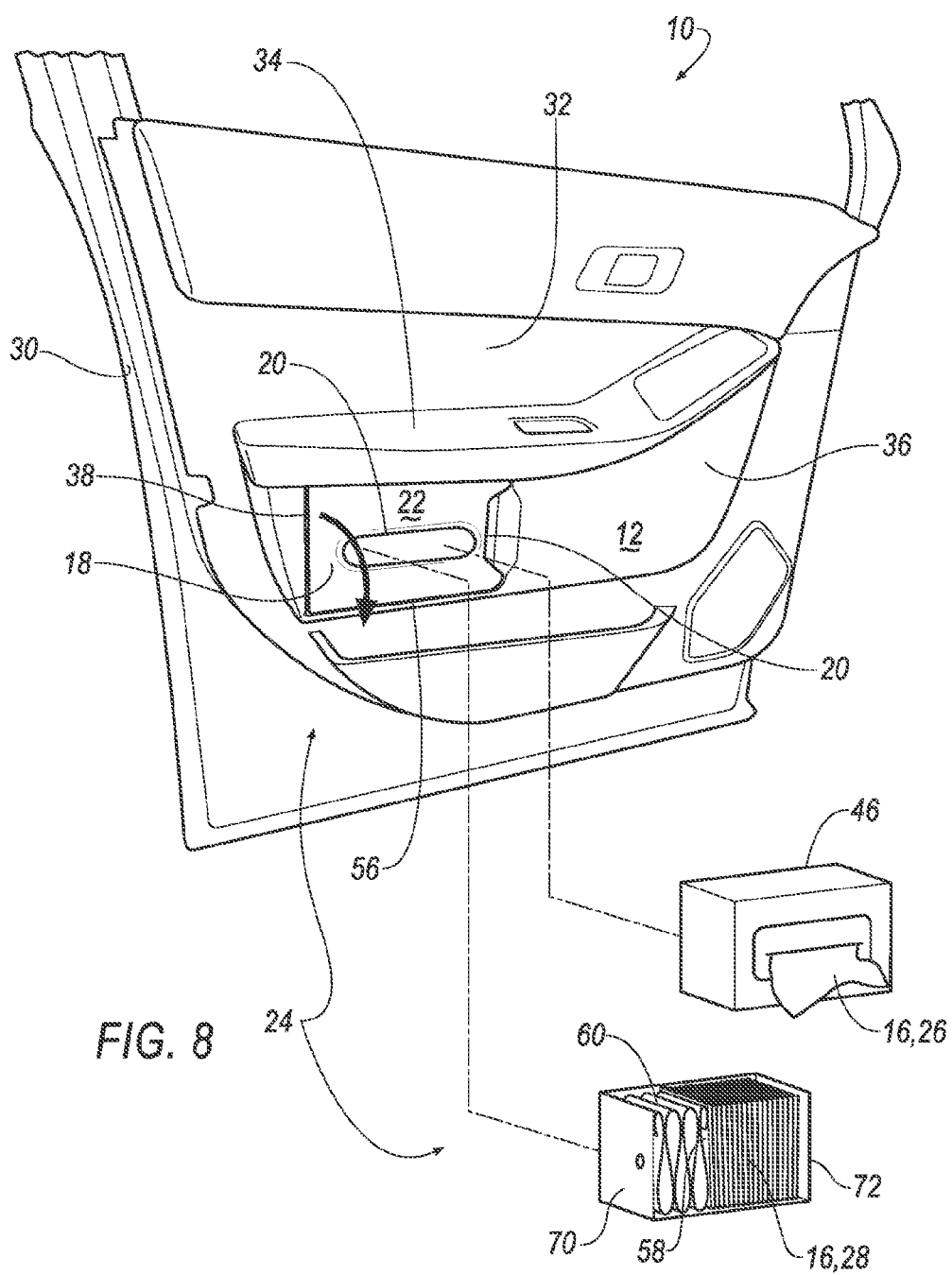
FIG. 8 is a perspective view of a portion of a door for a vehicle including a horizontal hinge on the cover with the compartment receiving either a full-size box of facial tissue or an insert for storing napkins.
Figure 9:
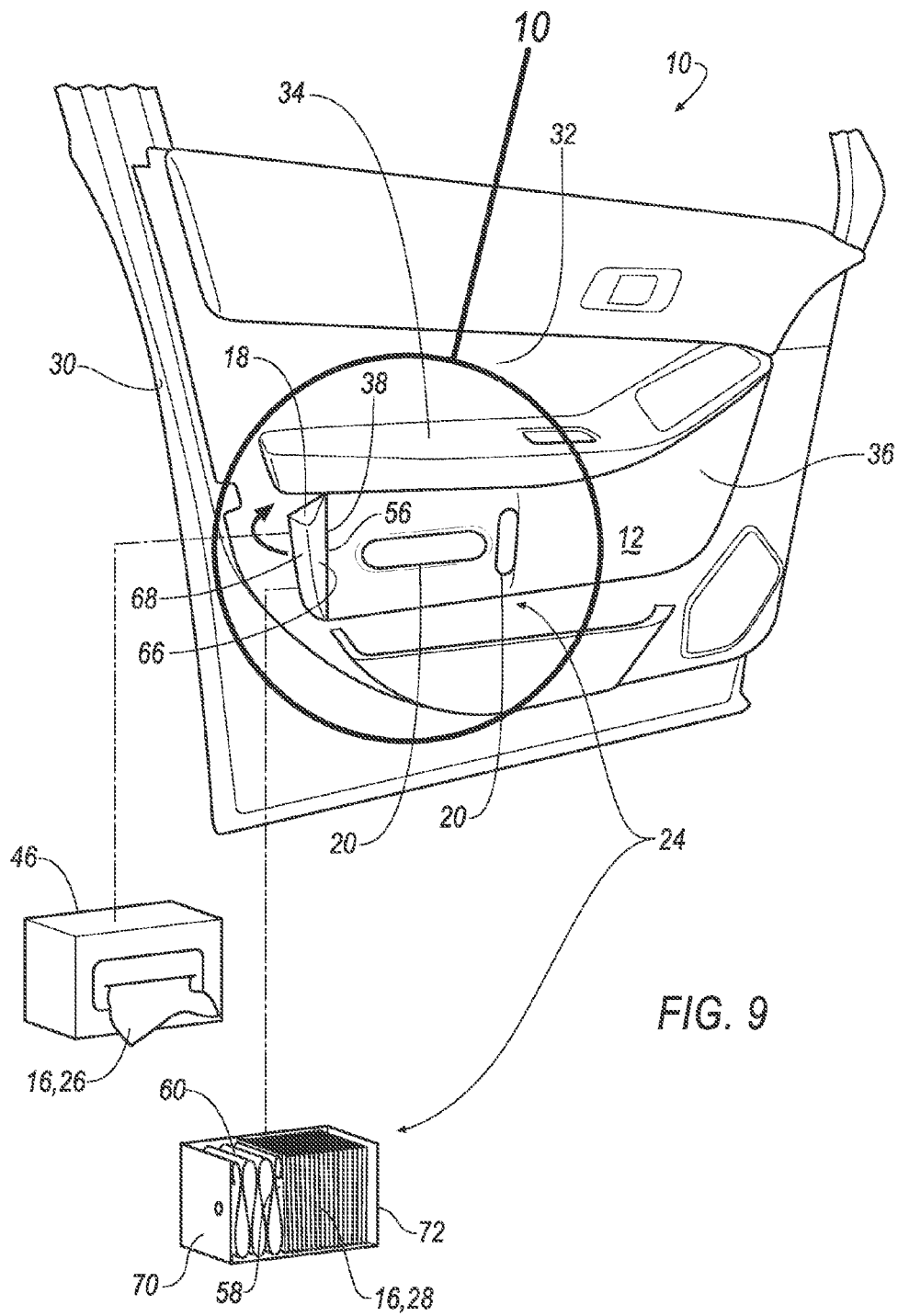
FIG. 9 is a perspective view of a portion of a door for a vehicle including a vertical hinge on the cover with the compartment receiving either a full-size box of facial tissue or an insert for storing napkins.
Figure 10:
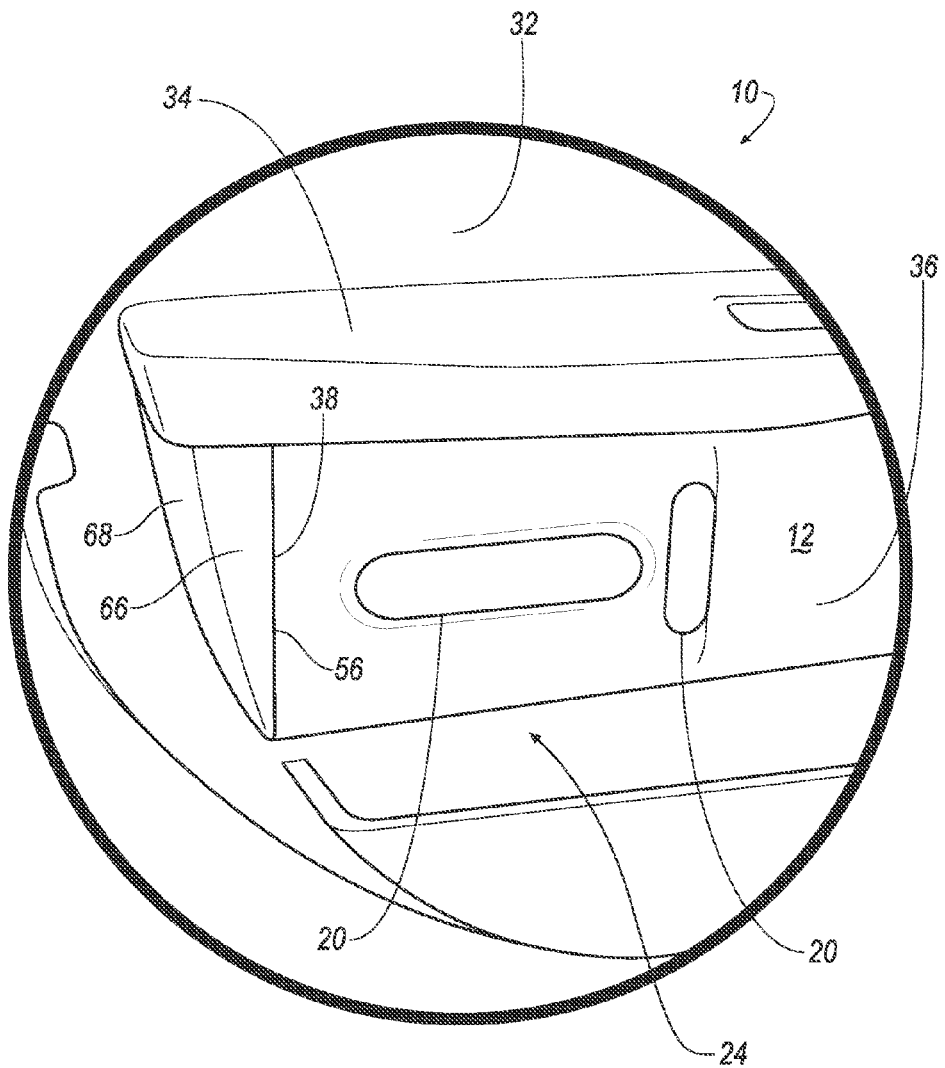
FIG. 10 is a perspective view of a portion of the door of FIG. 9A with the cover in a closed position.

As set forth above, the cover 18 defines the opening 20 through which the paper product 16 may be dispensed. The opening 20 extends through the outer surface 22 of the cover 18. The opening 20 may be elongated horizontally, as shown in FIGS. 1-3, for example, or may be elongated vertically, as shown in FIGS. 4-7, for example. The cover 18 may define two opening 20, as shown in FIGS. 8-10.

With reference to FIGS. 1-3, the storage system 24 may be configured to store a full-size box 46 of tissues 26. In FIGS. 1-3, the cover 18 includes a hinge 56 coupled to the cover 18 and to the compartment 14. The hinge 56 may be of any suitable type. The compartment 14 extends longitudinally along an axis A and the hinge 56 may extend longitudinally in parallel with the axis A, as shown in FIGS. 1-3.

With continued reference to FIGS. 1-3, in use, the cover 18 may be moved to the open position to access the compartment 14. The user may grip the opening 20 to unlock the retaining mechanism, e.g., to disengage the magnet from the keeper plate 58. With the cover 18 in the open position, the full-size box 46 of facial tissue 26 may be inserted into the compartment 14. The cover 18 may be moved to the closed position and a tissue 26 may be fed through the cover 18, as shown in FIG. 3.

Figure 4:
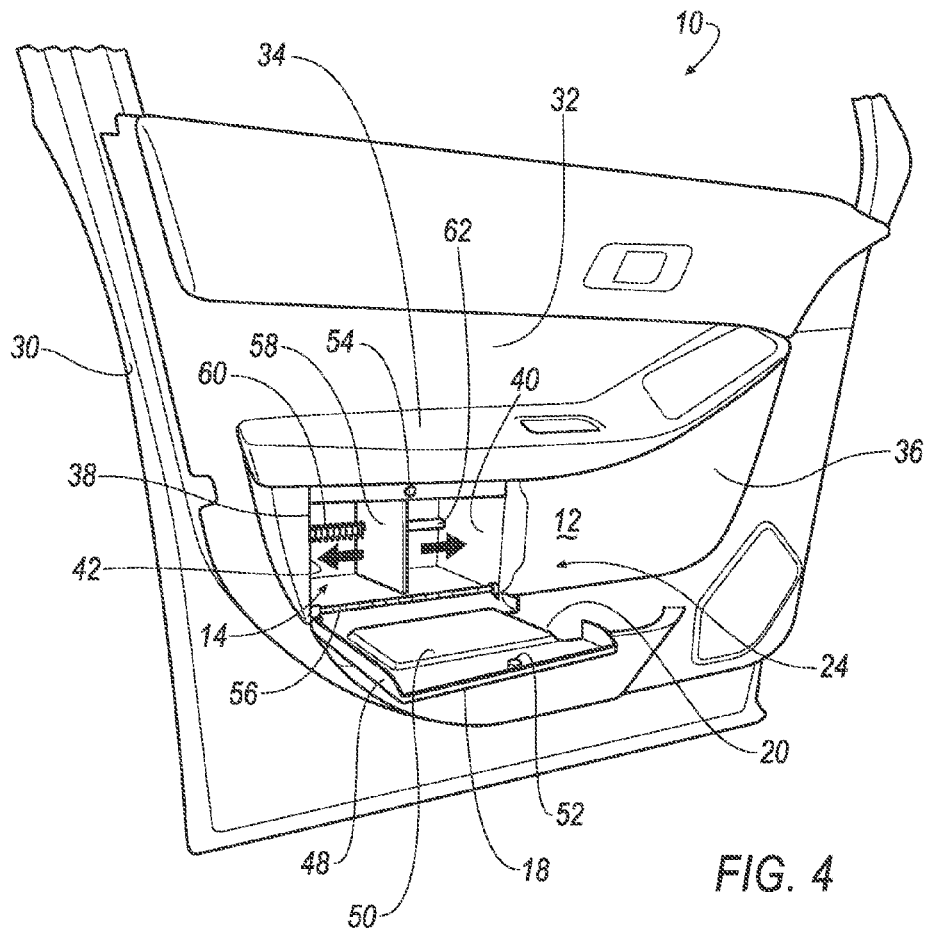
FIG. 4 is a perspective view of a portion of a door for a vehicle including a plate engaged with a track and a spring in the compartment.
Figure 5:
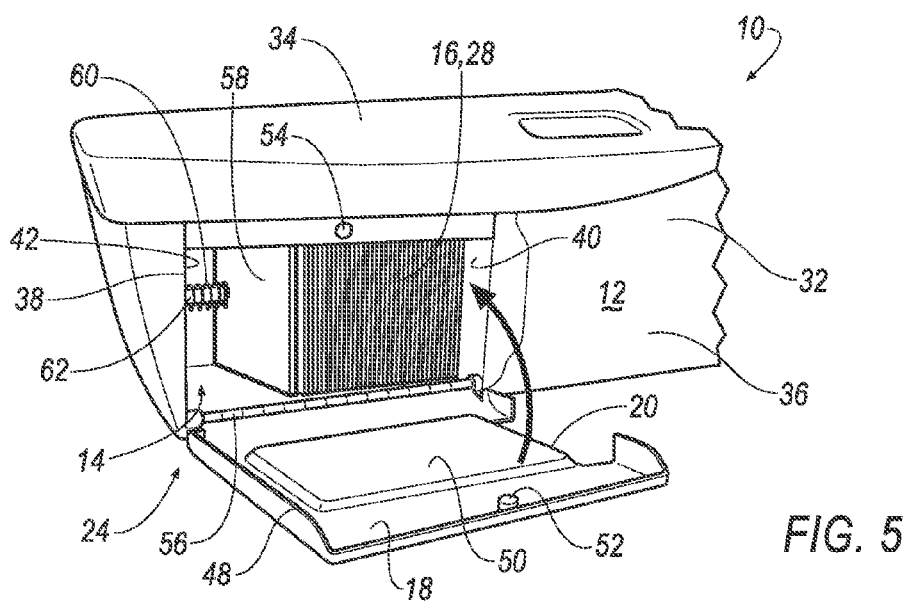
FIG. 5 is a perspective view of a portion of the door of FIG. 4 with napkins disposed in the compartment.

With reference to FIGS. 4-7, the storage system 24 may be configured to store dispensable paper products 16 such as loose napkins 28. With reference to FIGS. 4 and 5, the opening 20 may be elongated vertically at one end of the cover 18. A plate 58 may be disposed in the compartment 14 and a spring 60 may be coupled to the plate 58. The spring 60 urges the plate 58 toward the opening 20. The dispensable paper product 16, e.g., the loose napkins 28, may be stored between the plate 58 and the opening 20 and the spring 60 may bias the dispensable paper product 16, e.g., the loose napkins 28, toward the opening 20.

With reference to FIGS. 4 and 5, a track 62 may be coupled to the plate 58 for guiding the plate 58. The track 62 may be adjacent the back wall 44. The plate 58 may define a cutout for receiving the track 62.

The compartment 14 includes a first end wall 40 and a second end wall 42. The spring 60 extends between the second end wall 42 and the plate 58, and the dispensable paper product 16, e.g., the loose napkins 28, may be stored between the plate 58 and the first end wall 40. The opening 20 may be adjacent the first end wall 40. The spring 60 may be coupled to the second end wall 42 and the plate 58 in any suitable fashion. The spring 60 may be of any suitable type.

Figure 6:
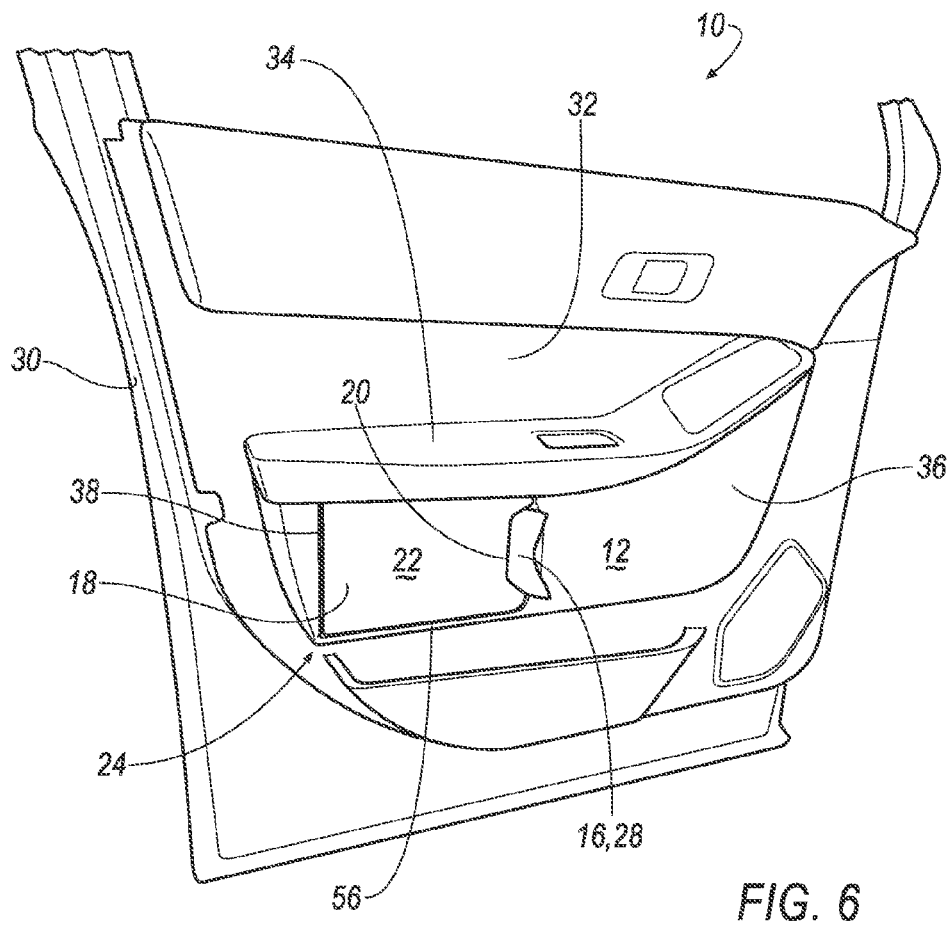
FIG. 6 is a perspective view of a portion of a portion of the door of FIG. 4 with the cover in a closed position.

With reference to FIGS. 4-6, in use, the user moves the cover 18 to the open position, e.g., by gripping the opening 20 and pulling the cover 18 from the closed position to the open position. When the cover 18 is in the open position, the user may slide the plate 58 against the bias of the spring 60 toward the second end wall 42. The user may then insert the paper products 16, e.g., the loose napkins 28, between the plate 58 and the first end wall 40. When the user releases the plate 58, the bias of the spring 60 moves the plate 58 toward the first end wall 40, and thus toward the paper products 16, e.g., the loose napkins 28, to pinch the paper products 16 between the plate 58 and the first end wall 40. The bias of the plate 58 against the paper products 16 caused by the spring 60 maintains the paper products 16 in an organized fashion. The cover 18 may be moved to the closed position and the paper product 16, e.g., a loose napkin, may be fed through the opening 20 in the cover 18, as shown in FIG. 6.

Figure 7:
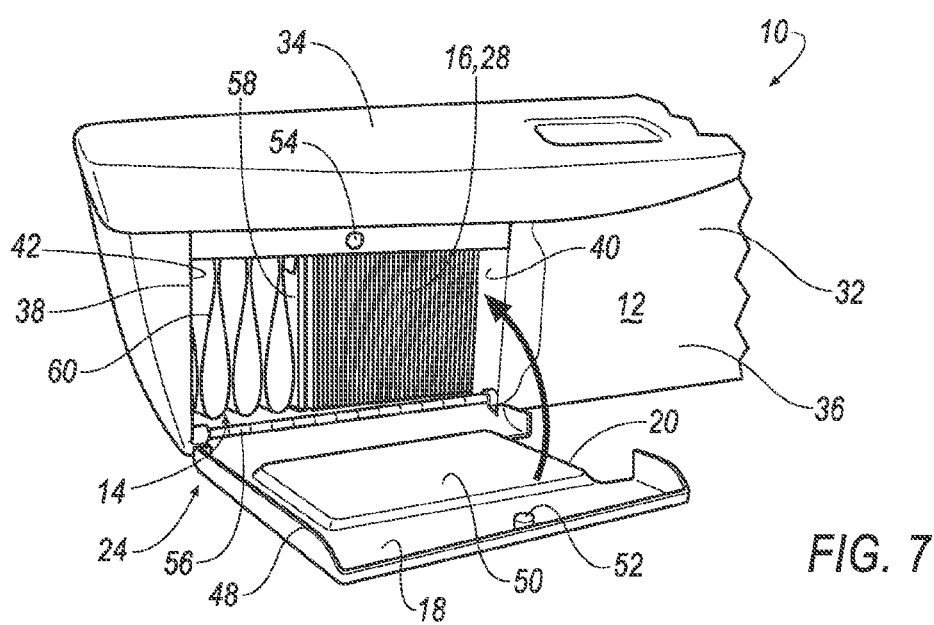
FIG. 7 is a perspective view of a portion of a door with an accordion spring coupled to the plate.

With reference to FIG. 7, the spring 60 may be an accordion-style spring. The accordion-style spring may extend from the second wall 72 to the plate 58, as shown in FIG. 7, for biasing the plate 58 toward the first end wall 40.

With continued reference to FIG. 8, for example, the storage system 24 includes a removable insert 64 configured to be inserted into the compartment 14 for holding the dispensable paper product 16. Alternatively, a full-size box 46 of facial tissue 26 may be inserted into the compartment 14, as shown in FIG. 9.

With reference to FIGS. 9 and 10, the hinge 56 may extend transverse to the axis A. For example, the outer surface 22 of the cover 18 may include a first portion 66 flush with the interior surface 12, and a second portion 68 extending from the first portion 66 and being contoured relative to the first portion 66 for aligning with contours of the interior surface 12.

With continued reference to FIGS. 9 and 10, the removable insert 64 includes a first wall 70 and a second wall 72 spaced from the first wall 70. A plate 58 is disposed between the first wall 70 and the second wall 72 for receiving the dispensable paper product 16 between the plate 58 and the second wall 72. A spring 60 is disposed between the first wall 70 and the plate 58 for biasing the plate 58 toward the second wall 72 to bias the dispensable paper product 16 toward the second wall 72. The spring 60 may be of any suitable type. For example the spring 60 may be an accordion-style spring 60, as shown in FIG. 9 or, may be of the same type as the spring 60 shown in FIGS. 4 and 5. It should be appreciated that the insert of FIG. 9 may include the track 62 of FIGS. 4 and 5 and that the plate 58 may be designed accordingly.

Figure 11:
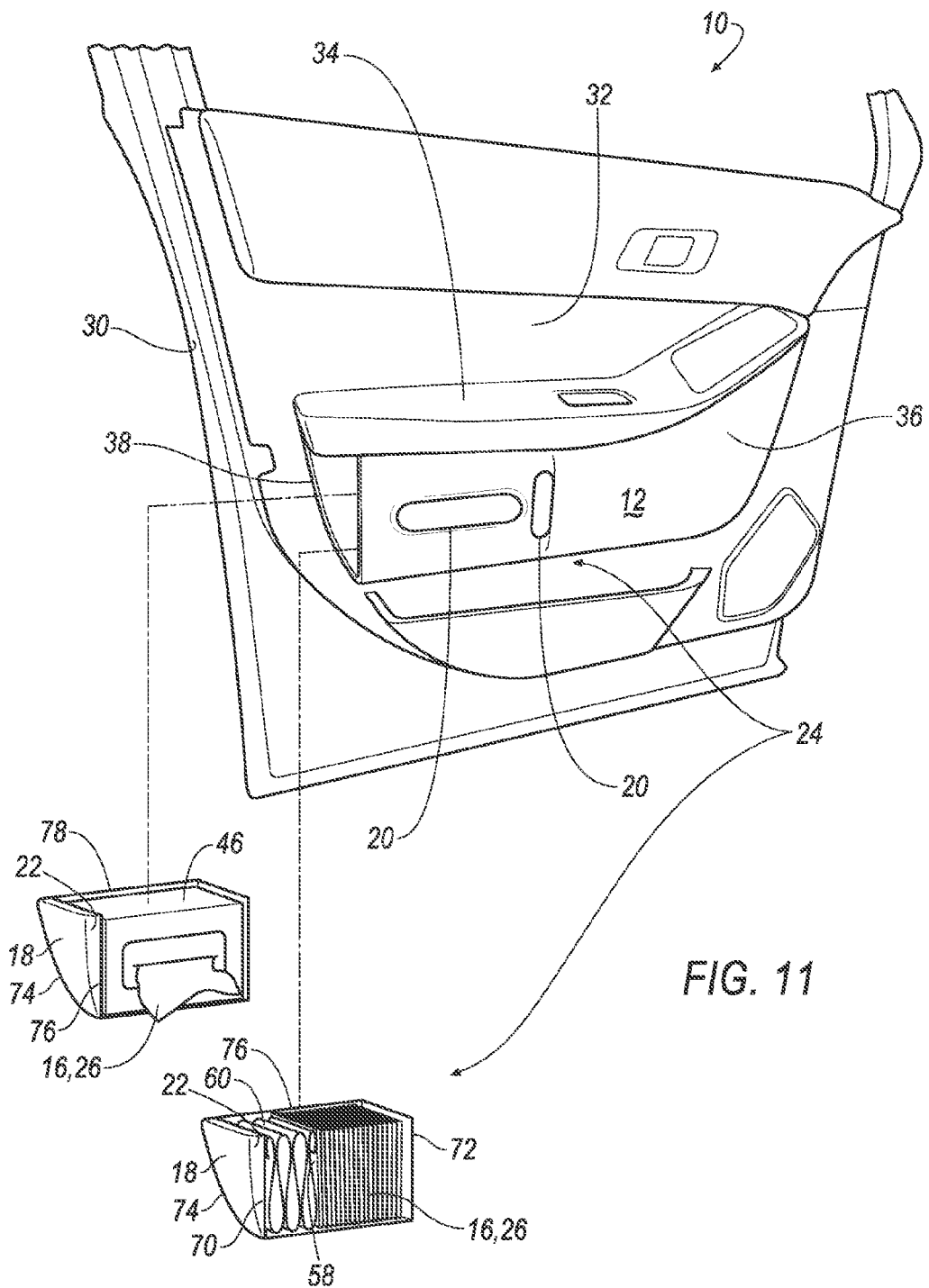
FIG. 11 is a perspective view of a portion of the door for a vehicle including two inserts each having a contoured end with one insert configured to receive a full-size box of facial tissue and the other insert configured to receive loose napkins.

With reference to FIG. 11, the removable insert 64 may include a contoured end 74 presenting the outer surface 22. In other words, in such a configuration, the contoured end 74, and thus the outer surface 22, is removable from the compartment 14. The contoured end 74 may be formed of the same type of material as the interior surface 12 of the trim panel 32. The contoured end 74 may include a perimeter 76 that abuts the interior surface 12. The perimeter 38 of the contoured end 74 may abut the perimeter 38 of the compartment 14.

As shown in FIG. 11, the removable insert 64 may include a cavity 78 for receiving a full-size box 46 of facial tissue 26. Another removable insert 64 may include the plate 58 and spring 60. The plate 58 and spring 60 may be of the type shown in FIGS. 4-5 or of the type shown in FIGS. 6-7, for example.

The disclosure has been described in an illustrative manner, and it is to be understood that the terminology which has been used is intended to be in the nature of words of description rather than of limitation. Many modifications and variations of the present disclosure are possible in light of the above teachings, and the invention may be practiced otherwise than as specifically described.

What is claimed is:

1. A door for a vehicle, the door comprising:
an interior surface;
a compartment extending into the interior surface for receiving a dispensable paper product;
a cover movable between a closed position covering the compartment and an open position exposing the compartment;
the cover defining an opening for accessing the dispensable paper product;
the cover including an outer surface flush with the interior surface when the cover is in the closed position;
an armrest extending from a vehicle-forward end to a vehicle-rearward end, wherein the interior surface extends downwardly from the armrest, and wherein the cover is disposed on the interior surface beneath the vehicle-rearward end of the armrest;
wherein the compartment includes an end wall; and
a plate disposed in the compartment and a spring coupled to the plate and biasing the plate in a vehicle-forward direction toward the end wall for biasing the dispensable paper product in the vehicle-forward direction toward the end wall.

2. The door as set forth in claim 1 wherein the compartment includes a perimeter and the cover is flush with the interior surface along the entire perimeter of the compartment when the cover is in the closed position.

3. The door as set forth in claim 1 wherein the opening extends through the outer surface of the cover.

4. The door as set forth in claim 1 further comprising a hinge coupled to the cover and to the compartment.

5. The door as set forth in claim 4 wherein the compartment extends longitudinally along an axis and the hinge extends in parallel with the axis.

6. The door as set forth in claim 5 wherein the outer surface of the cover is planar.

7. The door as set forth in claim 4 wherein the compartment extends longitudinally along an axis and the hinge extends transverse to the axis.

8. The door as set forth in claim 7 wherein the outer surface of the cover includes a first portion flush with the interior surface, and a second portion extending from the first portion and being contoured relative to the first portion for aligning with contours of the interior surface.

9. The door as set forth in claim 1 further comprising a track adjacent a back wall of the compartment and coupled to the plate for guiding the plate, the plate defining a cutout receiving the track.

10. The door as set forth in claim 1 wherein the opening is adjacent the end wall.

11. The door as set forth in claim 9 wherein the compartment includes a second end wall and the spring extends between the second end wall and the plate.

12. A door for a vehicle, the door comprising:
an armrest;
an interior surface defining a raised contour below the armrest;
a compartment extending into the interior surface for receiving a dispensable paper product;
a cover movable between a closed position covering the compartment and an open position exposing the compartment;
the cover defining an opening for accessing the dispensable paper product;
the cover including an outer surface flush with the interior surface when the cover is in the closed position; and
a removable insert configured to be slideably inserted into the compartment in a vehicle-forward direction for holding the dispensable paper product;
wherein the insert includes a first wall, a second wall spaced from the first wall, a plate disposed between the first wall and the second wall for receiving the dispensable paper product between the plate and the second wall, and a spring disposed between the first wall and the plate for biasing the plate toward the second wall to bias the dispensable paper product toward the second wall.

13. The door as set forth in claim 12 wherein the insert includes a contoured end presenting the outer surface, the contoured end matching contours of the raised contour of the interior surface.

14. The door as set forth in claim 13 wherein the contoured end includes a perimeter that abuts the interior surface.

15. The door as set forth in claim 12 further comprising a hinge coupled to the cover and to the compartment.

16. The door as set forth in claim 12 wherein the armrest extends from a vehicle-forward end to a vehicle-rearward end, and wherein the cover is disposed beneath the vehicle-rearward end of the armrest.

17. The door as set forth in claim 12 wherein the spring is an accordion-style spring.

18. The door as set forth in claim 1 further comprising a removable insert configured to be slideably inserted into the compartment in a vehicle-forward direction.

19. The door as set forth in claim 18 wherein the insert includes a first wall and a second wall with the plate and the spring disposed between the first wall and the second wall.

20. The door as set forth in claim 19 wherein the armrest extends from a vehicle-forward end to a vehicle-rearward end, wherein the removable insert includes a contoured end presenting the outer surface disposed beneath the vehicle-rearward end of the armrest, the contoured end matching contours of the raised contour of the interior surface.

* * * * *